(12) United States Patent
Watts et al.

(10) Patent No.: US 6,489,752 B1
(45) Date of Patent: Dec. 3, 2002

(54) METHOD AND APPARATUS FOR CHARGING BATTERIES

(75) Inventors: Fred S. Watts, New Freedom, PA (US); Danh T. Trinh, Towson, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/126,568

(22) Filed: Apr. 19, 2002

Related U.S. Application Data
(60) Provisional application No. 60/293,859, filed on May 25, 2001, now abandoned.

(51) Int. Cl.[7] .............................................. H01M 10/44
(52) U.S. Cl. ...................................................... 320/150
(58) Field of Search ................................ 320/127, 128, 320/137, 150, 153

(56) References Cited

U.S. PATENT DOCUMENTS 5,391,974 A * 2/1995 Shiojima et al.
5,477,126 A * 12/1995 Shiojima
5,497,068 A * 3/1996 Shiojima
5,637,982 A * 6/1997 Nanno et al.

* cited by examiner

*Primary Examiner*—Edward H. Tso
(74) *Attorney, Agent, or Firm*—Adan Ayala

(57) ABSTRACT

The charging method includes providing a current to the battery pack, sensing first and second battery temperatures, determining a first temperature change rate between the first and second battery temperatures, sensing a third battery temperature, determining a second temperature change between the second and third battery temperatures, and disabling termination of the charging method based on a temperature-based scheme if the first temperature change rate is equal to or exceeds a first predetermined threshold and the second temperature change rate is equal to or exceeds a second predetermined threshold.

16 Claims, 5 Drawing Sheets

METHOD AND APPARATUS FOR CHARGING BATTERIES

CROSS-REFERENCE TO RELATED APPLICATIONS

This application derives priority under 35 USC §119(e) from U.S. application Ser. No. 60/293,859, filed May 25, 2001, now abandoned.

FIELD OF THE INVENTION

This invention relates generally to a method and apparatus for charging rechargeable batteries.

BACKGROUND OF THE INVENTION

The several advantages of cordless power for portable power tools and certain kitchen and domestic appliances have led to the development of a wide range of sizes of power- or battery-packs, that is, a contained group of power cells. These power cells may include nickel cadmium (NiCd), nickel metal hydride (Nix), lithium, or lead-acid cells, etc.

Referring to FIGS. 1–2, a typcial battery pack 10 is connected to a charger 20. Battery pack 10 comprises a plurality of battery cells 11 connected in series, which dictate the voltage and storage capacity for battery pack 10. Battery pack 10 includes three battery contacts: first battery contact 12, second battery contact 14, and third battery contact 13. Battery contact 12 is the B+ (positive) terminal for battery pack 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery pack 10.

As shown in FIG. 2, the battery cells 11 are coupled between the battery contacts 12 and 14. In addition, a temperature sensing device 15, such as a negative temperature co-efficient (NTC) resistor, or thermistor, RT is typically coupled between battery contacts 13 and 14. The temperature sensing device is preferably in closer proximity to the cells 11 for monitoring of the battery temperature. Other components, such as capacitors, etc., or circuits can be used to provide a signal representative of the battery temperature.

The charger 20 preferably comprises a controller 21, which in turn includes positive terminal (B+) 16 and negative (B−) terminal 17, which are coupled to battery pack 10 via battery contacts 12 and 14, respectively. The positive terminal may also act as an input, preferably an analog/digital input, in order for the controller 21 to detect the battery voltage. In addition, the controller 21 may include another input T, preferably an analog/digital input, which is coupled to the temperature sensing device 15 via the third battery contact 13 (S). This allows the controller 21 to monitor the battery temperature. Controller 21 includes a microprocessor 23 for controlling the charging and monitoring operations. Controller 21 may control a current source 22 that provides current to battery pack 10. This current may be a fast charging current and/or an equalization current. Current source 22 may be integrated within controller 21.

Referring to FIG. 3, the battery temperature and voltage varies during the charging process. for example, battery temperature decreases as the battery is charged. The battery temperature then quickly increases as the battery becomes fully charged. However, if the charging process is not stopped when the battery is fully charged, the battery could be overcharged and thus damaged by the rising temperature. Accordingly, battery temperature or battery voltage are usually monitored as indicators of the full charge condition.

Among the voltage monitoring methods, the Saar double inflection termination method described in U.S. Pat. Nos. 4,388,582 and 4,392,101, is preferred to detect a battery reaching full charge. Other voltage monitoring methods more typically employed are (1) the minus-delta-voltage method, (2) the peak detect method, and (3) the voltage slope detect method. In the minus-delta-voltage method, a sample of the battery peak voltage is stored and compared to the most recent voltage. Termination occurs when the most recent voltage falls below a set point, usually within between 0.5% and 1.0% of the stored peak, or about 10 to 20 millivolts per cell for a NiCd battery.

The peak detect method is more modem version of the minus-delta-voltage method. Basically, the same method is used, except the set point can be set closer to the peak by using more accurate instrumentation.

The slope detect method is another voltage monitoring method. According to this method, the voltage peak B is detected by calculating the slope of the voltage curve V, or voltage change rate (dV/dt). Termination occurs when the voltage change rate is 0 or negative.

Temperature monitoring methods typically employed are (1) absolute temperature termination and (2) temperature change rate (slope) termination. Absolute temperature termination relies on the temperature rise that occurs when the battery is fully charged. Under this method, the charging process will be stopped when the battery temperature reaches and/or exceeds a certain temperature.

The temperature change rate (slope) termination method requires monitoring the slope of the battery temperature over time, or temperature change rate (dT/dt), during the charging process. Termination occurs when the temperature change rate reaches and/or exceeds a predetermined rate. In other words, termination occurs when a trip point is reached and/or exceeded.

Referring to FIGS. 1–2, the charger 20 may accept different battery packs 10, 10', 10", where like numerals refer to like parts. Battery packs 10, 10', 10" are similar, but differ in several respects. First, both battery packs 10, 10' receive air blown from charger fan 24 to cool cells 11. In battery pack 10, the temperature sensing device 15 is covered and/or disposed outside of the airflow, so that the airflow does not affect the temperature sensing. On the other hand, in battery pack 10', the temperature sensing device 15 is not covered and/or disposed in of the airflow, so that the airflow affects the temperature sensing. Battery pack 10" does not receive any air blown from charger fan 24. Accordingly, the temperature sensing device 15 cannot be affected by blown air.

FIG. 4 shows the temperature/voltage curves T and V, respectively, when battery pack 10' is charged, as opposed to the temperature/voltage curves for battery packs 10, 10", shown in FIG. 3. If the temperature curves T of FIGS. 3–4 are compared, it is obvious that the temperature curve of battery pack 10" is not as smooth, with many peaks and valleys. This is because the airflow affects the sensed temperature. However, having such peaks and valleys can cause termination of the charging process under the temperature change rate termination scheme prior to fully charging battery pack 10'. In other words, battery pack 10' may be undercharged because of the airflow.

It is an object of the invention to provide a charging and monitoring method that will not result in undercharged batteries.

SUMMARY OF THE INVENTION

In accordance with the present invention, a method for charging a rechargeable battery pack is proposed. The charging method includes providing a current to the battery pack, sensing first and second battery temperatures, determining a first temperature change rate between the first and second battery temperatures, sensing a third battery temperature, determining a second temperature change between the second and third battery temperatures, and disabling termination of the charging method based on a temperature-based scheme if the first temperature change rate is equal to or exceeds a first predetermined threshold and the second temperature change rate is equal to or exceeds a second predetermined threshold.

Also disclosed herein is a battery charging method, which method includes providing a current to the battery pack, sensing first and second battery temperatures, determining a first temperature change rate between the first and second battery temperatures, sensing a third battery temperature, determining a second temperature change between the second and third battery temperatures, and disabling termination of the charging method based on a temperature-based scheme if the first temperature change rate is equal to or below a first predetermined threshold and the second temperature change rate is equal to or below a second predetermined threshold.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 5 illustrates a first embodiment of the charging process according to the present invention, where FIG. 6 illustrates a second embodiment of the charging process according to the present invention, where

DETAILED DESCRIPTION

The invention is now described with reference to the accompanying figures, wherein like Numerals designate like parts. All the teachings of the Saar U.S. Pat. Nos. 4,388,582 and 4,392,101 are hereby incorporated by reference into this specification.

Figure 1:
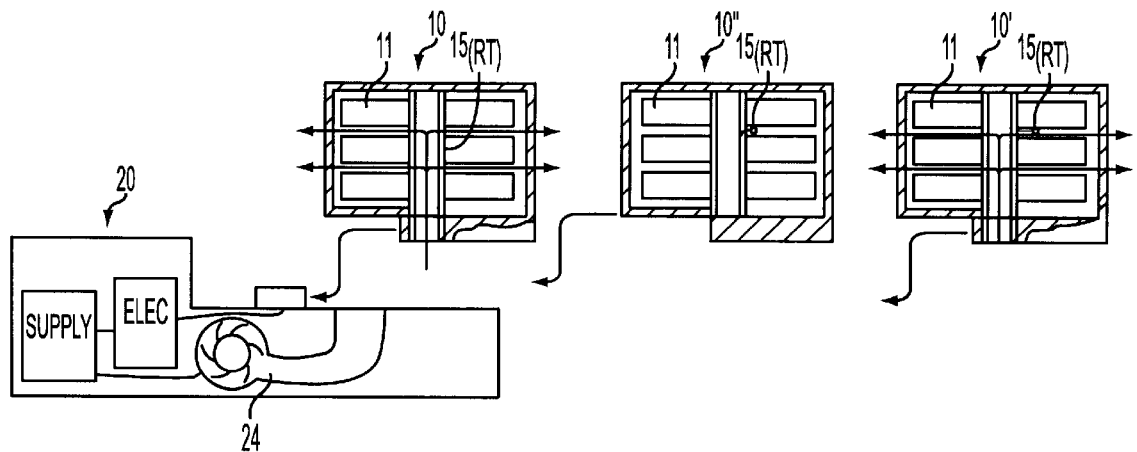
FIG. 1 shows a charger that accepts different types of battery packs.
Figure 2:
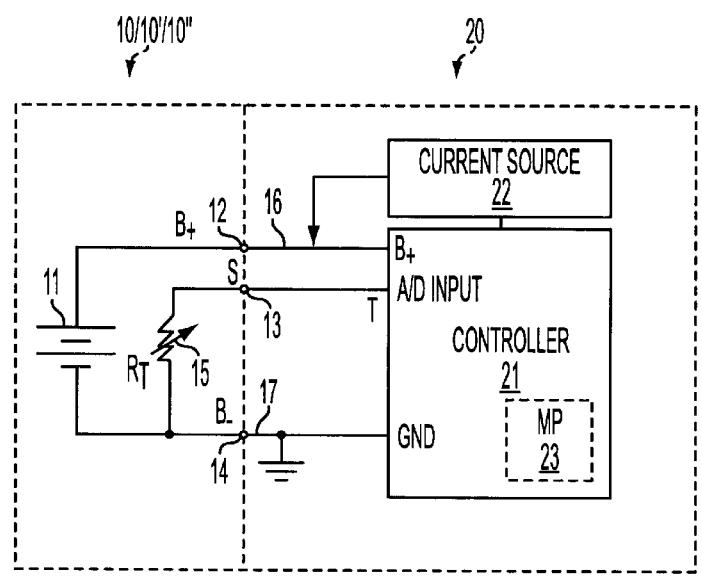
FIG. 2 is a circuit schematic diagram of a battery charger.

Persons skilled in the art should recognize that the methods disclosed below can be implemented with the charger 20 shown in FIGS. 1–2, preferably via the controller 21 and/or the processor 23. In other words, persons skilled in the art shall recognize that, while the discussion below refers to controlling 21 performing different steps, such steps can be carried out by the processor 23 or any other circuitry in charger 20.

Figure 5A:
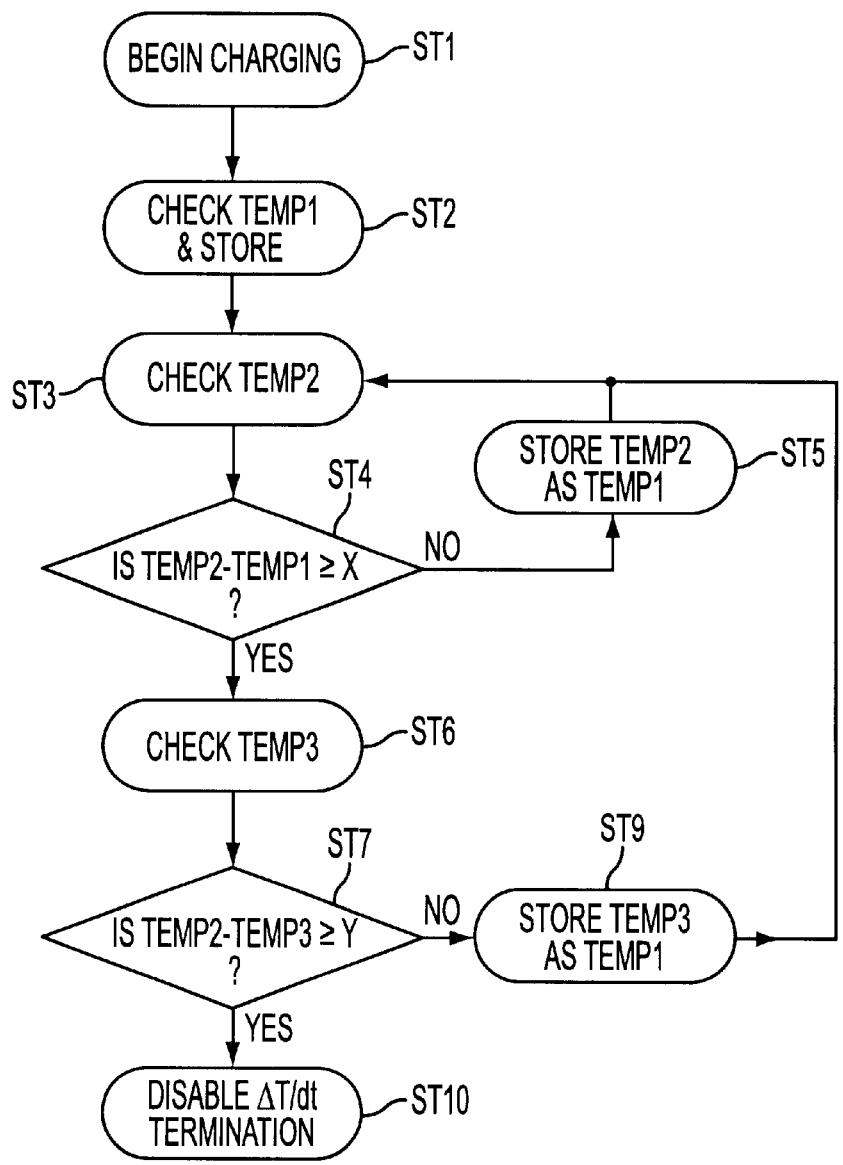
FIG. 5A illustrates a flowchart of the first embodiment of the charging process.

FIG. 5A is a flowchart of the different steps comprised in a first embodiment of the proposed method. The first step (ST1) is to begin the charging process by sending current to battery pack 10. The controller 21, via its inputs, may sense the initial battery pack temperature (TEMP1) and store it (ST2).

The controller 21 then continues to sense the battery temperature (TEMP2) (ST3). The controller 21 then compares the battery temperature TEMP2 with the initial battery temperature TEMP1 to determine whether the difference (TEMP2−TEMP1) is higher than, equal to, or lower than a predetermined threshold X (ST4). Persons skilled in the art shall recognize that controller 21 is effectively determining the temperature change rate.

Figure 5B:
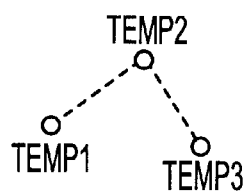
FIG. 5B illustrates a portion of the temperature curve.

The predetermined threshold X for NiCd batteries is preferably equal to or higher than zero A/D counts. Persons skilled in the art shall recognize that an A/D count may vary by the resolution of, the number of bits of, and/or the conversion range for the A/D converter in controller 21. nevertheless, persons skilled in the art shall recognize that controller 21 is checking whether the battery temperature has remained the same or has increased between TEMP1 and TEMP2 (see FIG. 5B). Preferably, the predetermined threshold X is equal to about 0.0380° Celsius.

If the difference between TEMP2 and TEMP1 (TEMP2−TEMP1) is below threshold X, the controller 21 will store TEMP2 as TEMP1 (ST5) and sense a new battery temperature TEMP2 (ST3).

If the difference between TEMP2 and TEMP1 (TEMP2−TEMP1) is equal to and/or higher than threshold X, controller 21 senses again the battery temperature (TEMP3) (ST6). The controller 21 then compares the battery temperatures TEMP2 and TEMP3 to determine whether the difference (TEMP2−TEMP3) is higher than, equal to, or lower than a predetermined threshold Y (ST7). Persons skilled in the art shall recognize that controller 21 is effectively determining the temperature change rate.

The predetermined threshold Y for NiCd batteries is preferably equal to or higher than one A/D count. Persons skilled in the art shall recognize that controller 21 is checking whether the battery temperature has remained the same or has decreased between TEMP2 and TEMP3 (see FIG. 5B). Preferably, the predetermined threshold Y is equal to about 0.077° Celsius.

If the difference between TEMP2 and TEMP3 (TEMP2−TEMP3) is below threshold Y, the Controller 21 will store TEMP3 as TEMP1 (ST9) and sense a new battery temperature TEMP2 (ST3).

Figure 3:
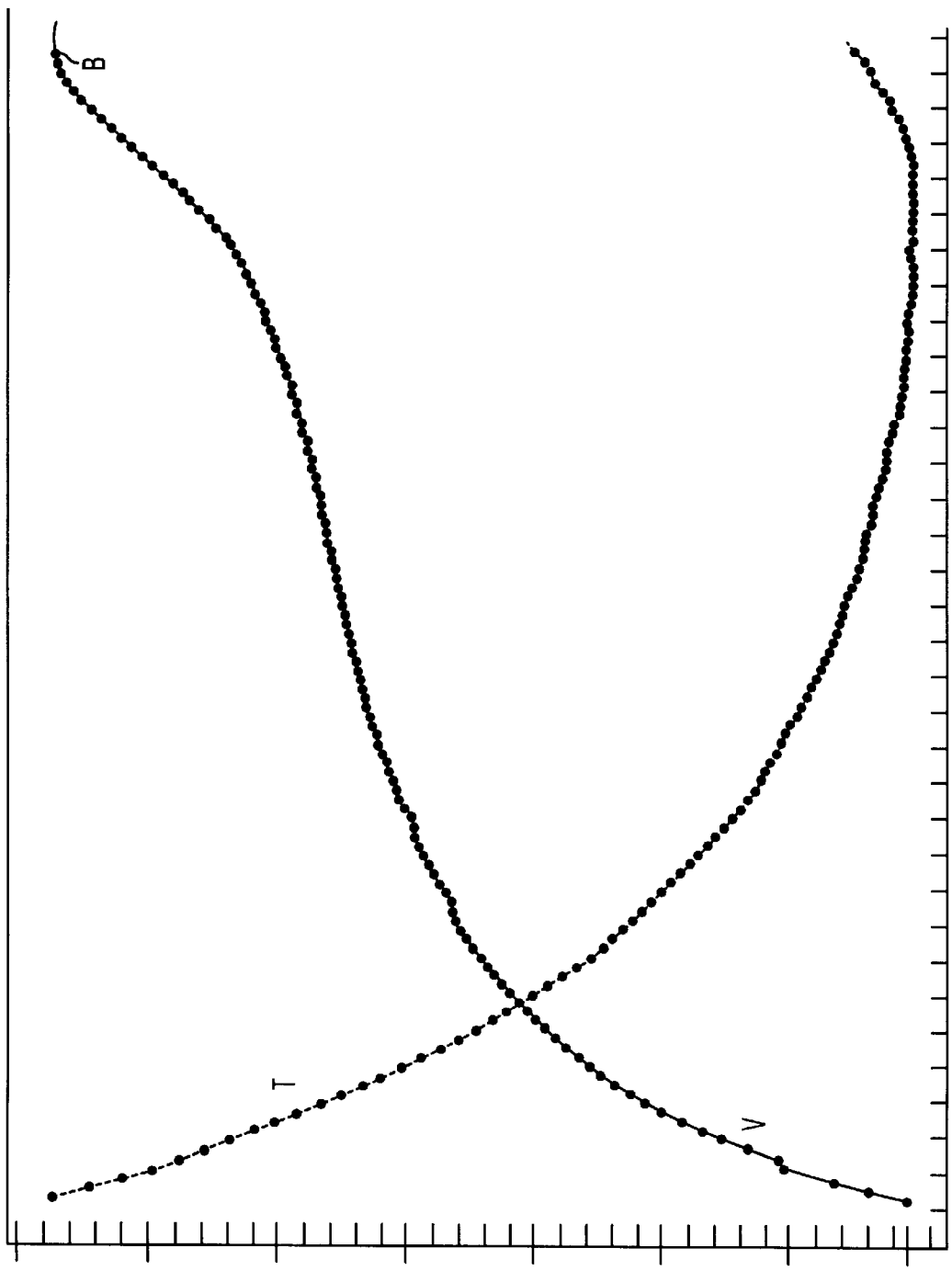
FIG. 3 is a graph showing the voltage and temperature curves for battery packs that are not affected by airflow.
Figure 4:
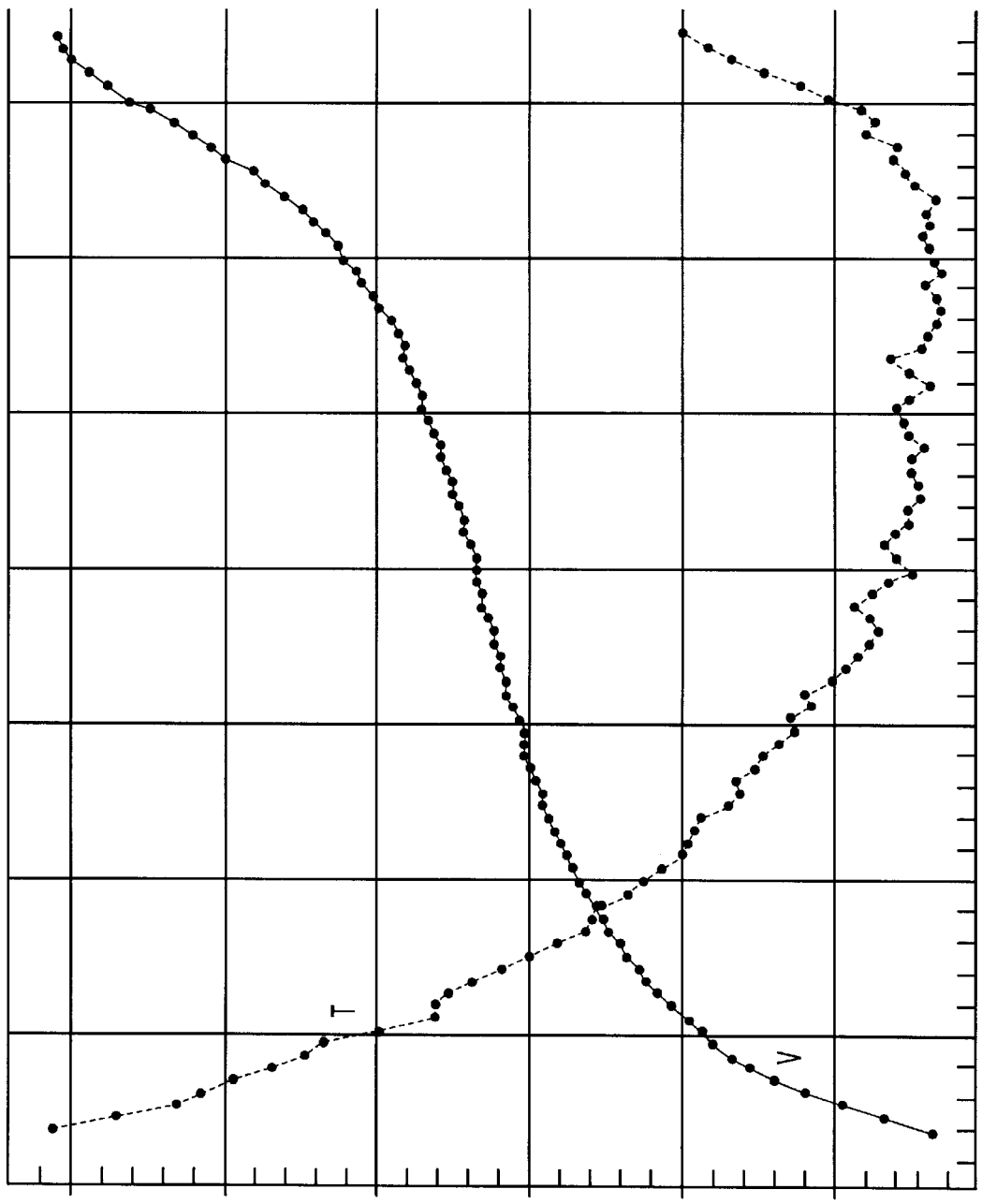
FIG. 4 is a graph showing the voltage and temperature curves for battery packs that are affected by airflow.

If the difference between TEMP2 and TEMP3 (TEMP2−TEMP3) is equal to and/or higher than threshold Y, the controller 21 then disables the temperature change rate termination scheme (ST10). Alternatively, the controller 21 may also disable any other temperature-based charging, such as the absolute temperature method. Effectively, such double-stage scheme would prevent disablement of the temperature-based charging termination schemes if the battery temperature remains constant and/or continues to increase, i.e., the typical temperature curve when the battery pack is reaching full charge (see FIG. 3).

Persons skilled in the art shall recognize that the comparison steps ST4 and ST7 can be defined in the logical opposite to achieve the same result. In other words, rather than checking whether the difference between TEMP2 and TEMP1 (TEMP2−TEMP1) is equal to and/or higher than threshold X, controller 21 can check whether the difference between TEMP1 and TEMP2 (TEMP1−TEMP2) is equal to and/or lower than a predetermined threshold X'. Persons skilled in the art will recognize that threshold X' may be equal to or lower than threshold X.

Similarly, rather than checking whether the difference between TEMP2 and TEMP3 (TEMP2−TEMP3) is equal to and/or higher than threshold X, controller 21 can check whether the difference between TEMP3 and TEMP2 (TEMP3−TEMP2) is equal to and/or lower than a predetermined threshold Y'. Persons skilled in the art will recognize that threshold Y' may be equal to or lower than threshold Y.

Figure 6A:
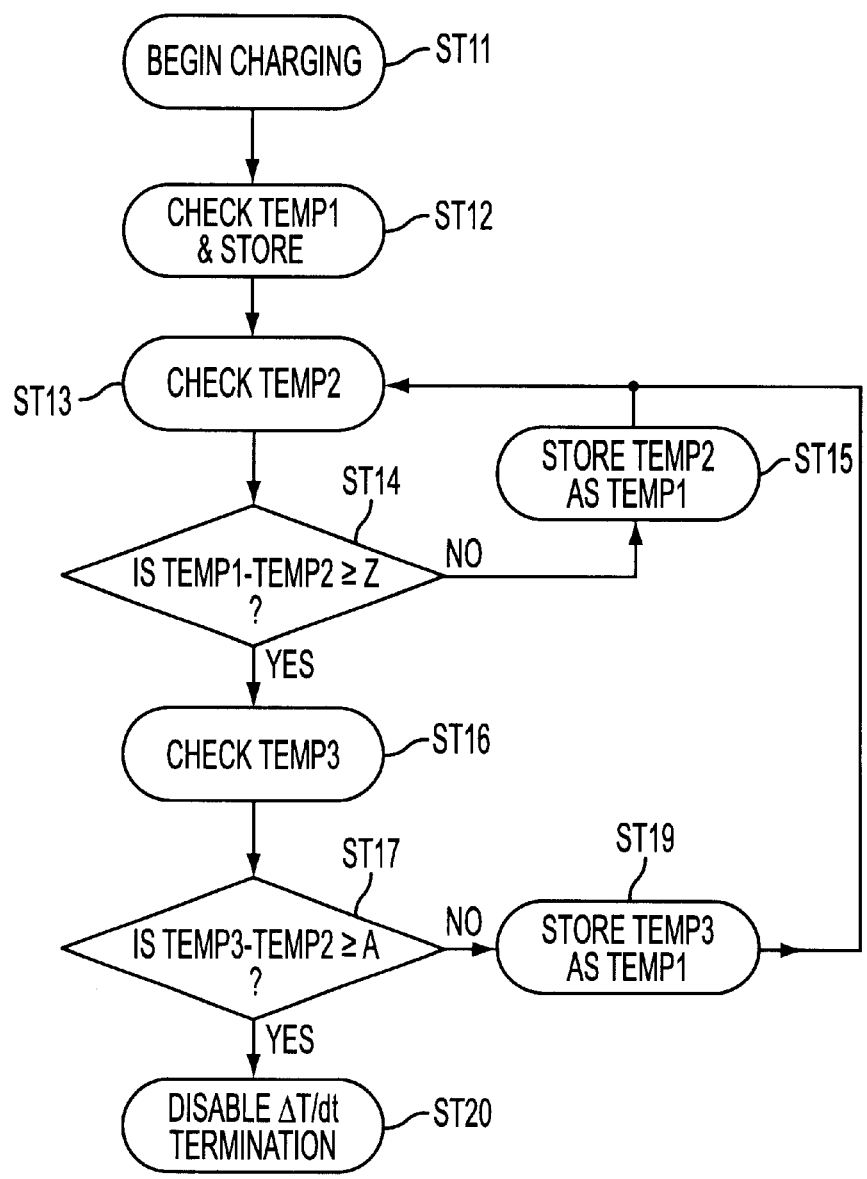
FIG. 6A illustrates a flowchart of the second embodiment of the charging process.
Figure 6B:
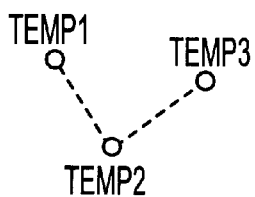
FIG. 6B illustrates a portion of the temperature curve.

FIG. 6B is a flowchart of the different steps comprised in a second embodiment of the proposed method, where the teachings found in the embodiment described above is herein incorporated by reference. The first step (ST11) is to begin the charging process by sending current to battery pack 10. The controller 21, via its inputs, may sense the initial battery pack temperature (TEMP1) and store it (ST12).

The controller 21 then continues to sense the battery temperature (TEMP2) (ST13). The controller 21 then compares the initial battery temperature TEMP1 with the battery temperature TEMP2 to determine whether the difference (TEMP1−TEMP2) is higher than, equal to, or lower than a predetermined threshold Z (ST14). Persons skilled in the art shall recognize that controller 21 is effectively determining the temperature change rate.

The predetermined threshold Z for NiCd batteries is preferably equal to or higher than zero A/D counts. Persons skilled in the art shall recognize that controller 21 is checking whether the battery temperature has remained the same or has decreased between TEMP1 and TEMP2 (see FIG. 6B). Preferably, the predetermined threshold Z is equal to about 0.038° Celsius.

If the difference between TEMP1 and TEMP2 (TEMP1−TEMP2) is below threshold Z, the controller 21 will store TEMP2 as TEMP1 (ST15) and sense a new battery temperature TEMP2 (ST13).

If the difference between TEMP1 and TEMP2 (TEMP1−TEMP2) is equal to and/or higher than threshold Z, controller 21 senses again the battery temperature (TEMP3) (ST16). The controller 21 then compares the battery temperatures TEMP3 and TEMP2 to determine whether the difference (TEMP3−TEMP2) is higher than, equal to, or lower than a predetermined threshold A (ST17). Persons skilled in the art shall recognize that controller 21 is effectively determining the temperature change rate.

The predetermined threshold A for NiCd batteries is preferably equal to or higher than one A/D count. Persons skilled in the art shall recognize that controller 21 is checking whether the battery temperature has remained the same or has increased between TEMP2 and TEMP3 (see FIG. 6B). Preferably, the predetermined threshold A is equal to about 0.0770° Celsius.

If the difference between TEMP3 and TEMP2 (TEMP3−TEMP2) is below threshold A, the controller 21 will store TEMP3 as TEMP1 (ST19) and sense a new battery temperature TEMP2 (ST13).

If the difference between TEMP3 and TEMP2 (TEMP3−TEMP2) is equal to and/or higher than threshold A, the controller 21 disables the temperature change rate termination scheme (ST20). Alternatively, the controller 21 may also disable any other temperature-based charging, such as the absolute temperature method. Effectively, such double-stage scheme would prevent disablement of the temperature-based charging termination schemes if the battery temperature remains constant and/or continues to decrease, i.e., the typical temperature curve at the beginning of the charging process (see FIG. 3).

Persons skilled in the art shall recognize that the comparison steps ST14 and ST17 can be defined in the logical opposite to achieve the same result. In other words, rather than checking whether the difference between TEMP1 and TEMP2 (TEMP1−TEMP2) is equal to and/or higher than threshold Z, controller 21 can check whether the difference between TEMP2 and TEMP1 (TEMP2−TEMP1) is equal to and/or lower than a predetermined threshold Z'. Persons skilled in the art will recognize that threshold Z' may be equal to or lower than threshold Z.

Similarly, rather than checking whether the difference between TEMP3 and TEMP2 (TEMP3−TEMP2) is equal to and/or higher than threshold A, controller 21 can check whether the difference between TEMP2 and TEMP3 (TEMP2−TEMP3) is equal to and/or lower than a predetermined threshold A'. Persons skilled in the art will recognize that threshold A' maybe equal to or lower than threshold A.

Persons skilled in the art shall also recognize that the different embodiments can be executed independently, sequentially or simultaneously.

Persons skilled in the art may recognize other alternatives or additions to the means or steps disclosed herein. However, all these additions and/or alterations are considered to be equivalents of the present invention.

What is claimed is:

1. A method for charging a battery comprising:
   providing a current to the battery;
   sensing first and second battery temperatures;
   determining a first temperature change rate between the first and second battery temperatures;
   sensing a third battery temperature;
   determining a second temperature change between the second and third battery temperatures; and
   disabling termination of the charging method based on a temperature-based scheme if the first temperature change rate is equal to or exceeds a first predetermined threshold and the second temperature change rate is equal to or exceeds a second predetermined threshold.

2. The method of claim 1, wherein the battery has a thermistor.

3. The method of claim 2, wherein the thermistor is outside of an airflow.

4. The method of claim 2, wherein the thermistor is inside an airflow.

5. The method of claim 1, wherein the first predetermined threshold is about 0.0380 ° Celsius.

6. The method of claim 1, wherein the second predetermined threshold is about 0.0770 ° Celsius.

7. The method of claim 1, wherein the second predetermined threshold is about two times larger than the first predetermined threshold.

8. The method of claim 1, wherein the temperature-based scheme is a temperature change rate termination scheme or an absolute temperature scheme.

9. A method for charging a battery comprising:
   providing a current to the battery;
   sensing first and second battery temperatures;
   determining a first temperature change rate between the first and second battery temperatures;
   sensing a third battery temperature;
   determining a second temperature change between the second and third battery temperatures; and disabling termination of the charging method based on a temperature-based scheme if the first temperature change rate is equal to or below a first predetermined threshold and the second temperature change rate is equal to or below a second predetermined threshold.

10. The method of claim 9, wherein the battery has a thermistor.

11. The method of claim 10, wherein the thermistor is outside of an airflow.

12. The method of claim 10, wherein the thermistor is inside an airflow.

13. The method of claim 9, wherein the first predetermined threshold is about 0.038° Celsius.

14. The method of claim 9, wherein the second predetermined threshold is about 0.0770° Celsius.

15. The method of claim 9, wherein the second predetermined threshold is about two times larger than the first predetermined threshold.

16. The method of claim 9, wherein the temperature-based scheme is a temperature change rate termination scheme or an absolute temperature scheme.

* * * * *